United States Patent
Bock

(10) Patent No.: US 7,592,794 B2
(45) Date of Patent: Sep. 22, 2009

(54) INTEGRATED LOW POWER RECEIVED SIGNAL STRENGTH INDICATOR (RSSI) WITH LINEAR CHARACTERISTIC

(75) Inventor: Andreas Bock, Hemmingen (DE)

(73) Assignee: Texas Instruments Deutschland GmbH, Freising (DE)

( * ) Notice: Subject to any disclaimer, the term of this patent is extended or adjusted under 35 U.S.C. 154(b) by 322 days.

(21) Appl. No.: 11/690,623

(22) Filed: Mar. 23, 2007

(65) Prior Publication Data

US 2008/0024221 A1 Jan. 31, 2008

Related U.S. Application Data

(60) Provisional application No. 60/882,393, filed on Dec. 28, 2006.

(30) Foreign Application Priority Data

Mar. 30, 2006 (DE) ........................ 10 2006 014 842

(51) Int. Cl.
*G01S 3/02* (2006.01)
(52) U.S. Cl. .................. 324/76.14; 455/130; 455/226.1; 455/226.4
(58) Field of Classification Search .............. 324/76.14; 455/226.1–226.4, 130
See application file for complete search history.

(56) References Cited

U.S. PATENT DOCUMENTS 3,908,165 A * 9/1975 Cauldwell ................ 324/76.14
5,521,542 A * 5/1996 Kimura ...................... 327/352
6,720,757 B2 * 4/2004 Khorram et al. ......... 324/76.14
7,339,363 B2 * 3/2008 Khorram et al. ......... 324/76.14
7,415,256 B2 * 8/2008 Nakano ...................... 455/130
2001/0055955 A1 * 12/2001 Wagemans ............... 455/226.4
2003/0176174 A1 * 9/2003 Seppinen et al. ......... 455/226.1
2003/0184277 A1 * 10/2003 Khorram et al. ......... 324/76.14

FOREIGN PATENT DOCUMENTS

GB      2 336 437      3/1998

* cited by examiner

*Primary Examiner*—Timothy J Dole
*Assistant Examiner*—Benjamin M Baldridge
(74) *Attorney, Agent, or Firm*—John J. Patti; Wade J. Brady, III; Frederick J. Telecky, Jr

(57) ABSTRACT

An RSS indicator with a linear characteristic that is of a simple configuration, low current consumption and small die area requirements, comprises a pair of input transistors with coupled emitters and base electrodes to which an input signal is differentially applied. Each of the input transistors has a collector load circuit connected between a first supply terminal and its collector, and a tail current sink connected between a second supply terminal and the coupled emitters. The load circuit of each input transistor includes a current source which supplies a current copied from the tail current. A signal strength indicator signal is obtained from a differential signal between corresponding output nodes of the collector load circuits by taking the mean value of the differential signal referenced to the first supply terminal.

10 Claims, 6 Drawing Sheets

INTEGRATED LOW POWER RECEIVED SIGNAL STRENGTH INDICATOR (RSSI) WITH LINEAR CHARACTERISTIC

This application claims priority under 35 U.S.C. 119 of German Application No. 10 2006 014 842.8, filed Mar. 30, 2006, and of U.S. Provisional Application No. 60/882,393, filed Dec. 28, 2006, the entireties of which are incorporated herein.

BACKGROUND

The present invention relates to a received signal strength indicator.

A received signal strength indicator (RSSI) is typically needed in data communication equipment to allow operation over a wide range of input signal levels. Known RSS indicators have either a non-linear logarithmic characteristic or use complex circuitry to achieve a linear characteristic. A high circuit complexity results in high current consumption and large die area. See, for example, U.S. Pat. Nos. 5,338,985; 6,360,086; 6,636,099; and 6,720,757, all of which are incorporated by reference herein.

A received signal strength indicator with a linear characteristic, i.e., an output signal proportional to the amplitude of a received input signal, may significantly simplify an application as compared to solutions with a logarithmic characteristic. However, the linear characteristic should not be achieved at the expense of high power consumption, high complexity and large die area.

SUMMARY

The present invention provides a received signal strength indicator with a linear characteristic that has a simple configuration, low current consumption and small die area requirements.

In one aspect, the invention provides a received signal strength indicator comprising a pair of input transistors with coupled emitters and base electrodes to which an input signal is differentially applied. Each of the input transistors has a collector load circuit connected between a first supply terminal and its collector, and a tail current sink connected between a second supply terminal and the coupled emitters. The load circuit of each input transistor includes a current source which supplies a current copied from the tail current. A signal strength indicator signal is obtained from a differential signal between corresponding output nodes of the collector load circuits by taking the mean value of the differential signal referenced to the first supply terminal.

This aspect of the invention is based on the understanding that in an emitter-coupled configuration, the common mode voltage is given by the product of the tail current and the load resistor, and that shifting the output signal by the known common mode voltage provides a signal with a common mode voltage proportional to the input signal amplitude.

In a described basic example implementation of the inventive received signal strength indicator, the load circuit of each input transistor includes a resistor connected in parallel with the current source, and the output node is the collector node. The output signal is differentially taken between the collectors of the input transistors.

In another, more complex example embodiment, the load circuit of each input transistor includes a common base connected transistor and a resistor connected in the collector path of the common base connected transistor. The common base connected transistor and resistor are connected in parallel with the current source, and the output node is the connection node between the resistor and the collector of the common mode connected transistor. In this embodiment, the common base connected transistors help to turn off the output current faster, resulting in reduced rise/fall times; and the current is turned off completely when the output voltage approaches the level at the supply rail. The output signal is taken differentially between the collector/resistor connection nodes of the collector load circuits.

In a preferred embodiment, the common base connected transistors operate on a common load resistor and the received signal strength indicator output is available at the connection node of the collectors. With this configuration, the amplitude of the received signal strength indicator signal is increased by a factor of two, and the high frequency performance is improved.

To increase the range of linear operation, degeneration resistors are added in the emitter circuits of the input transistors.

BRIEF DESCRIPTION OF THE DRAWINGS

Further advantages and features of the invention will appear from the following detailed description with reference to the accompanying drawings, wherein:

FIG. 1a illustrates signals with a DC component ($I_{DC} \neq 0$). FIG. 1b illustrates signals without a DC component ($I_{DC}=0$). FIG. 2a illustrates theoretical signals with subtracted DC component ($I_{DC}=0$). FIG. 2b illustrates actual signals with subtracted DC component ($I_{DC}=0$). FIG. 3a illustrates an output signal of the described approach. FIG. 3b illustrates an output signal of the basic concept.

DETAILED DESCRIPTION

Figure 1A:
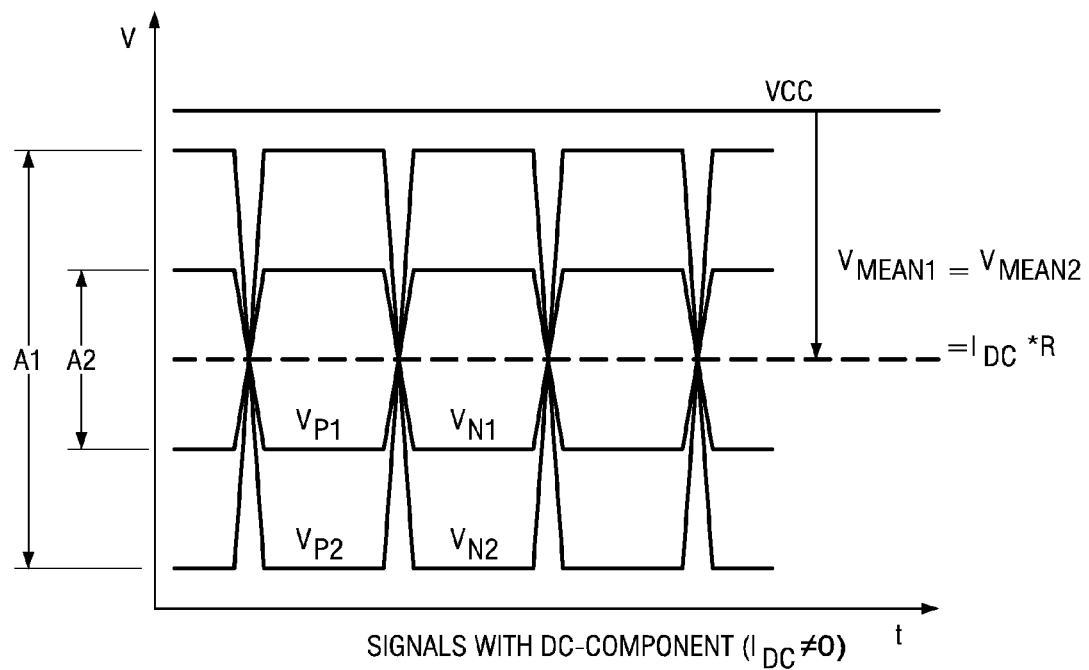
FIGS. 1a, 1b, 2a, 2b, 3a and 3b are signal diagrams illustrating some of the principles of the invention.

With reference to FIG. 1a, it is seen that in an emitter-coupled input stage, two differential output signals $V_{P1}$, $V_{N1}$ and $V_{P2}$, $V_{N2}$ that have different amplitudes may have the same common mode voltage referenced to the positive supply voltage $V_{CC}$. Signal $V_{P1}$, $V_{N1}$ has an amplitude A1 which is greater than an amplitude A2 of signal $V_{P2}$, $V_{N2}$, and the mean value $V_{MEAN1}$ of the first signal is equal to the mean value $V_{MEAN2}$ of the second signal. In an emitter-coupled stage, the common mode voltage is equal to the product of the tail current $I_{DC}$ and the value of the load resistor R: $V_{CM}=I_{DC}*R$.

Without a common mode voltage, the signals $V_{P1}$, $V_{N1}$ and $V_{P2}$, $V_{N2}$ would be as shown in FIG. 1a. They would still have the same amplitudes, but different mean voltage levels $V_{MEAN1}$ and $V_{MEAN2}$ with reference to the positive supply $V_{CC}$.

Figure 2A:
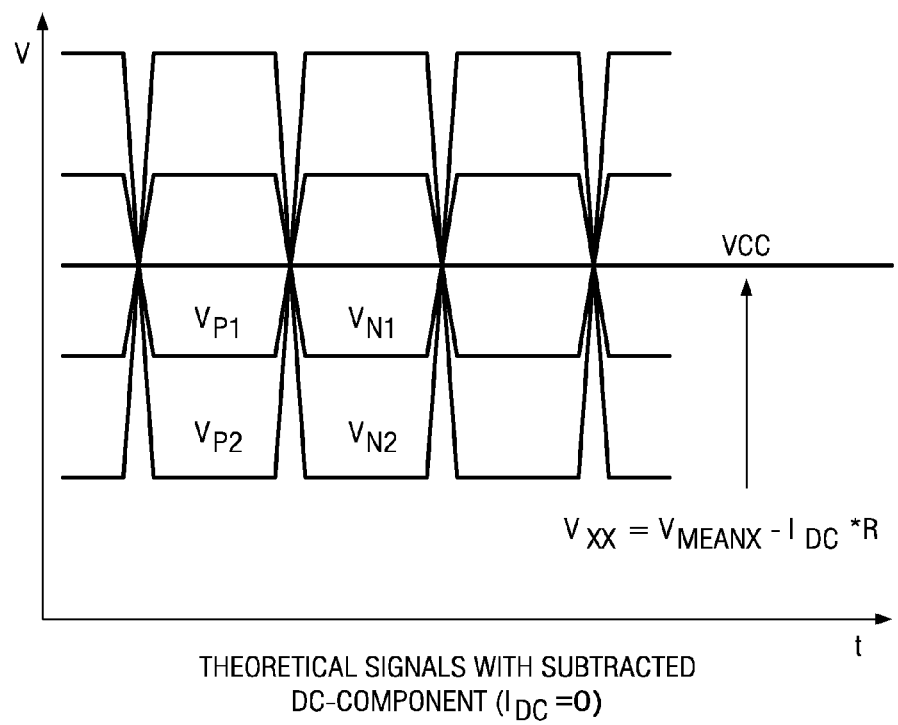
Figure 2B:
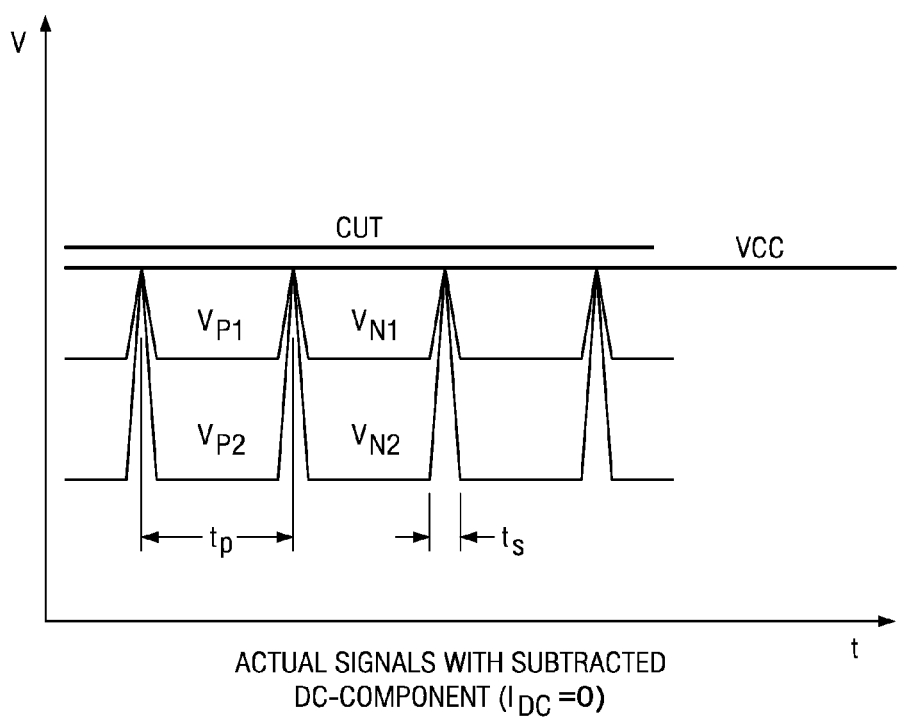

If the signal levels were shifted by the known common mode voltage $V_{CM}$, the common mode voltage would be shifted to $V_{CC}$, as illustrated in FIG. 2a. This can be achieved by subtracting half of the tail current of a typical emitter-coupled stage from each of the two differential output currents. In a realistic circuit implementation where the available positive supply voltage is $V_{CC}$, the current source which subtracts half of the tail current will turn off when the output voltage swing rises to the level of the positive supply $V_{CC}$, resulting in the signals shown in FIG. 2b.

Figure 1B:
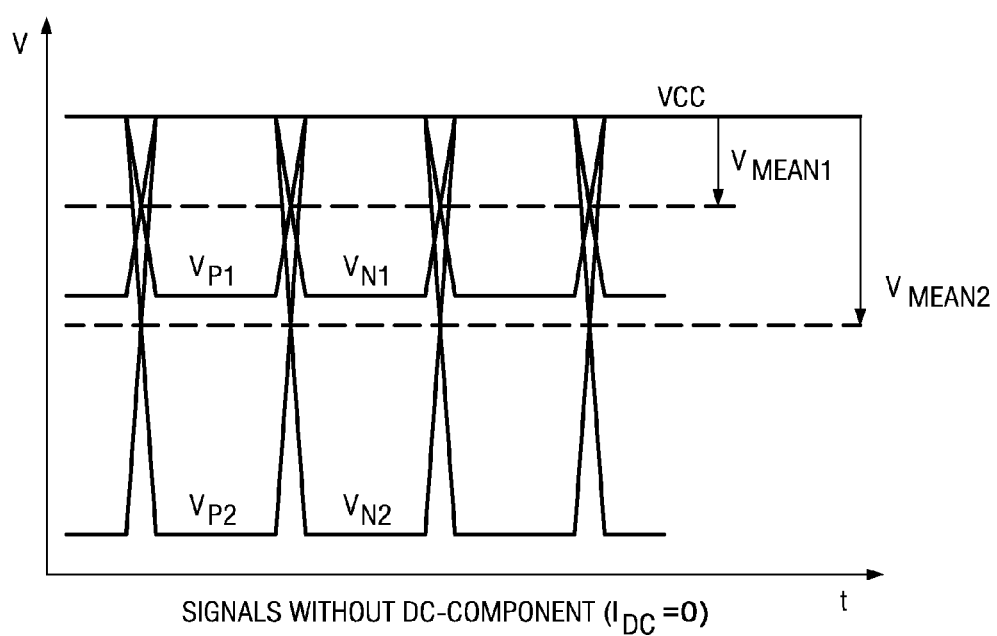
Figure 3A:
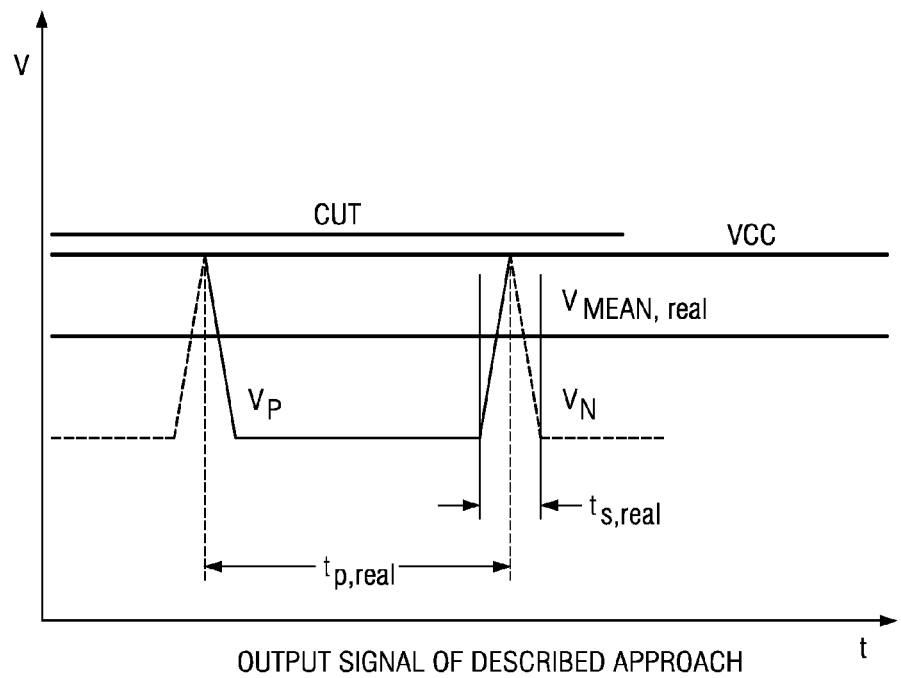
Figure 3B:
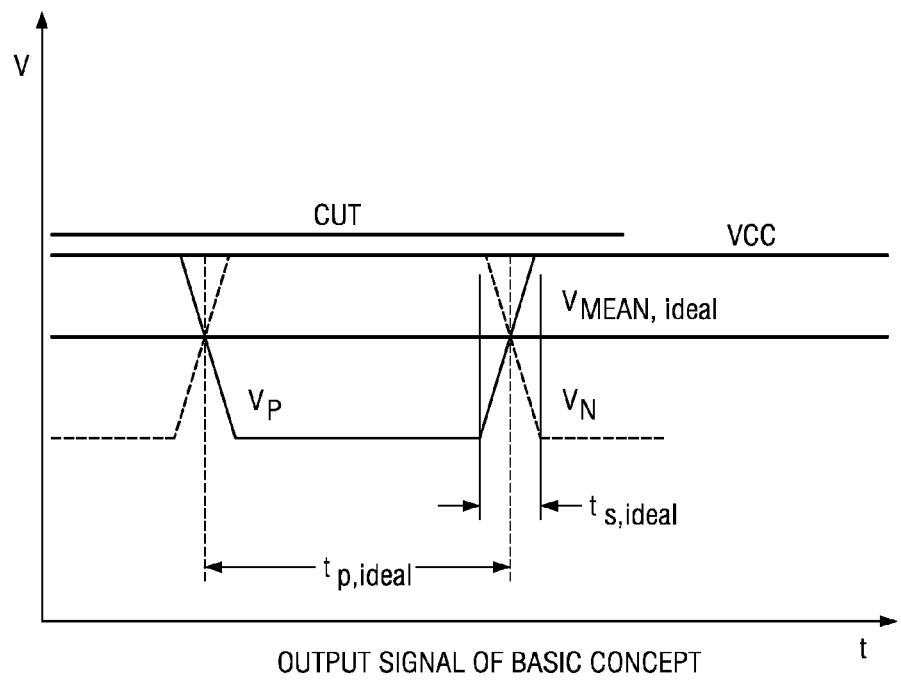

With this approach, an ideal differential output $V_P$, $V_N$ would be as illustrated in FIG. 3b. Assuming an "ideal" signal as shown in FIG. 1b, the mean value of the output signal $V_{MEAN,ideal}$ would be independent of the signal period $t_p$, ideal and of the signal rise/fall time $t_s$. In the actual implementation to be disclosed here, the mean value of the output signal $V_{MEAN}$, real will shift towards the positive supply $V_{CC}$ when the ratio $t_p$ real/$t_s$ real decreases, as seen in FIG. 3a.

Figure 4:
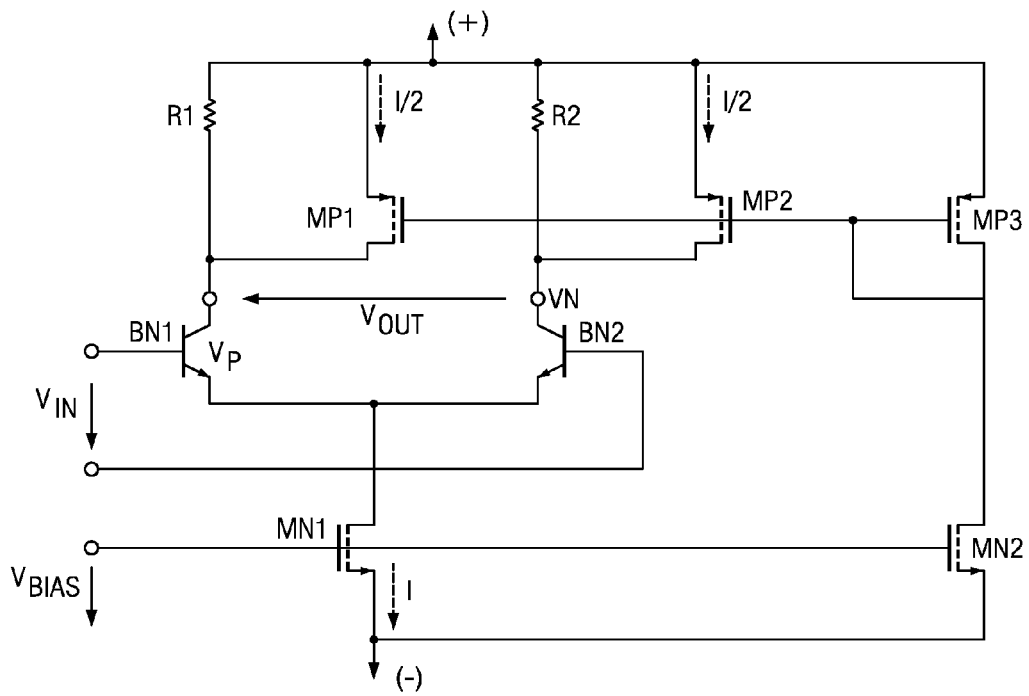
FIG. 4 is a schematic circuit diagram of a basic RSS indicator implementation.

With reference now to FIG. 4, the basic circuit implementation of the RSS indicator includes a pair of bipolar npn transistors BN1, BN2 in an emitter-coupled configuration. An input signal $V_{IN}$ is applied differentially between the base electrodes of both input transistors. A tail current sink is formed by an NMOS transistor MN1 which has its drain connected to the coupled emitters and its source connected to the negative supply terminal (−). The gate of MN1 is driven by a bias control voltage $V_{BIAS}$.

Each input transistor BN1, BN2 has a collector load circuit comprising a resistor R1 (R2) and a parallel connected PMOS transistor MP1 (MP2). A circuit branch with a PMOS transistor MP3 in series with an NMOS transistor MN2 is connected between the positive and negative supply terminals (+) and (−).

Figure 5:
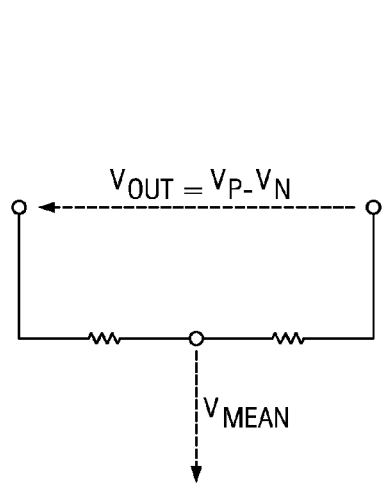
FIG. 5 illustrates how a mean voltage is derived from a differential output.
Figure 6:
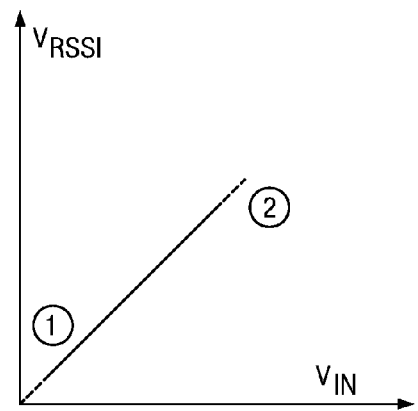
FIG. 6 illustrates graphically a desired linear characteristic of the RSS indicator.

Transistor MN2 has its gate interconnected with the gate of transistor MN1 so as to copy the tail current I to the circuit branch comprising transistors MP3 and MN2. By having their gates connected to the gate of transistor MP3, transistors MP1 and MP2 each constitute a current mirror capable of supplying half of the tail current I. The current mirrors constitute matched current sources, each of which supplies exactly half of the tail current I when the input signal $V_{IN}$ is zero. A differential output signal $V_{OUT}=V_P-V_N$ is taken between the collector nodes of input transistors BN1, BN2. As seen in FIG. 5, it is easy to derive the desired mean output voltage $V_{MEAN}$ by connecting a resistive divider between the collector nodes. The resulting characteristic is depicted in FIG. 6, where an RSS indicator voltage $V_{RSSI}$ is proportional to an input signal $V_{IN}$, as desired. It should be noted here that the RSS indicator voltage $V_{RSSI}$ is referenced to the positive supply voltage $V_{CC}$, i.e., $V_{RSSI}=V_{CC}-V_{MEAN}$.

Figure 7:
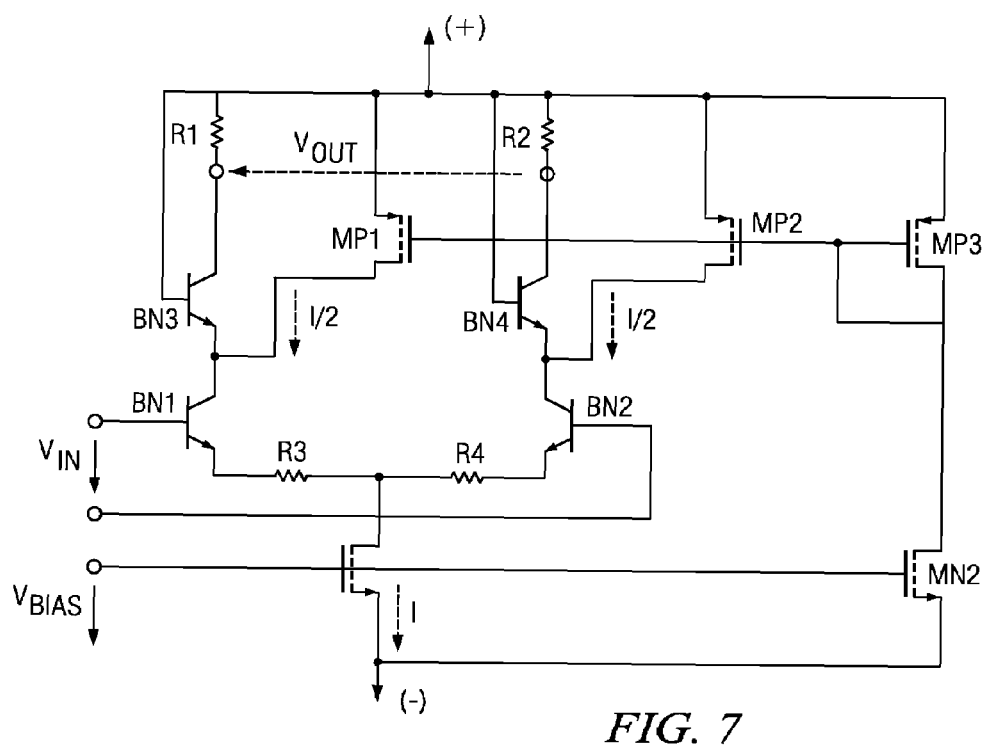
FIG. 7 is a schematic circuit diagram of an example of an improved RSS indicator implementation.

In the improved implementation shown in FIG. 7, where like reference signs are used for components similar to those in FIG. 4, each collector load circuit has a bipolar npn transistor BN3 (BN4) connected in series with the corresponding resistor R1 (R2) in a common base configuration. These common base connected transistors BN3, BN4 help to turn off the output current faster by reducing the rise/fall time ts (see FIG. 3a) and, more importantly, ensure complete turning off of the output current. In this embodiment, the differential output voltage $V_{OUT}$ is taken between the connection nodes of resistors R1, R2 with the corresponding transistor BN3, BN4, as shown in FIG. 7.

In the embodiment shown in FIG. 7, each input transistor BN1, BN2 has a degeneration resistor R3, R4 in its emitter circuit to increase the range of linear operation, allowing a linear RSS indicator characteristic for higher input amplitudes.

Figure 8:
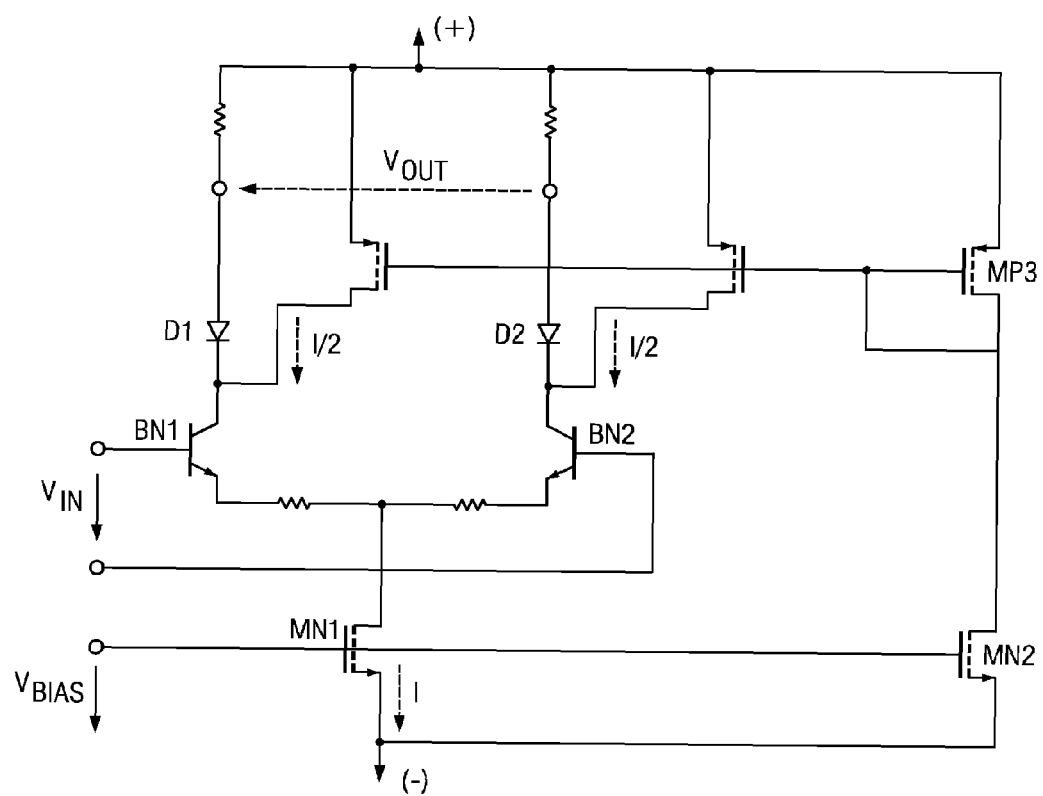
FIG. 8 is a schematic circuit diagram of another example RSS indicator implementation.

The embodiment in FIG. 8 is generally similar to that in FIG. 7, but the common base connected transistors BN3, BN4 have each been replaced with a diode, D1 and D2, respectively.

Figure 9:
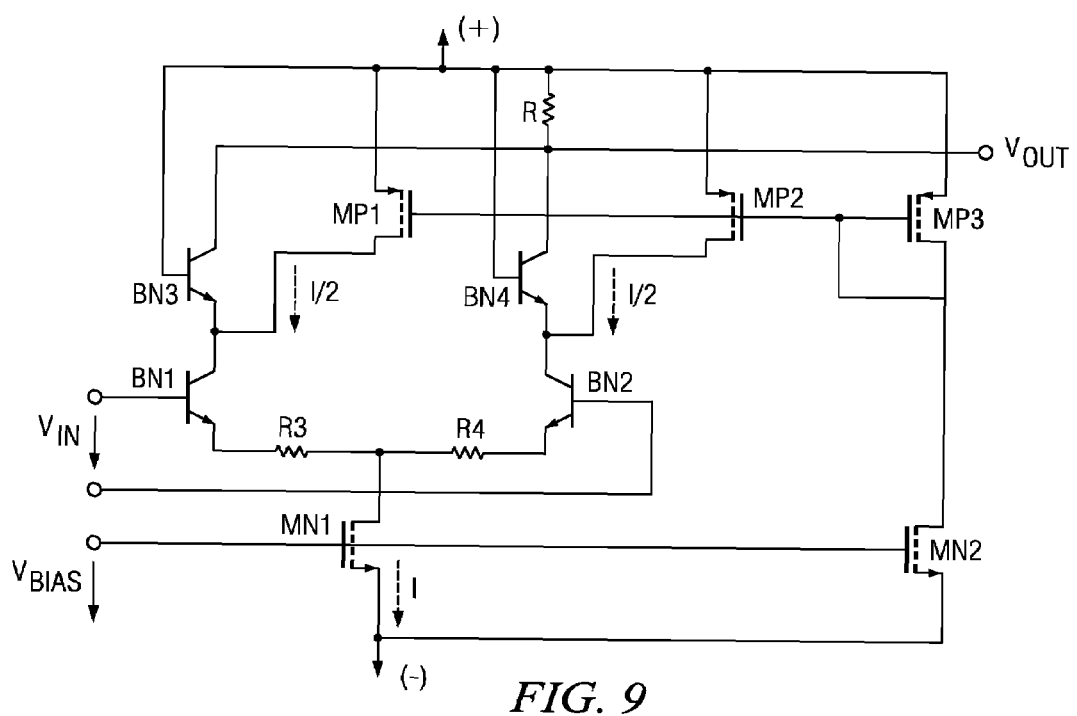
FIG. 9 is a schematic circuit diagram of a preferred example RSS indicator implementation.

The preferred embodiment in FIG. 9 is another variant of the implementation in FIG. 7. In this embodiment, the common base connected transistors BN3 and BN4 operate on a common load resistor R. The received signal strength output is directly available at the collector interconnection node of transistors BN3, BN4, again referenced to the positive supply terminal. Since it is not necessary to derive a mean value from a differential output signal, the amplitude of the RSS indicator signal is doubled compared to the previous embodiments. In addition, since the collector interconnection node is on a substantially constant RF level, the RF performance is improved.

In the embodiments disclosed, the received signal strength indicator is typically incorporated in an integrated BiCMOS circuit. It should be understood, however, that the invention is not limited to such an application. In particular, it is not necessary to use bipolar transistors in the received signal strength indicator. Similar functionality can be achieved with MOS transistors as well. Likewise, while MOS transistors are used in the current sources of the particular embodiments shown, it should be clear that bipolar transistors could be used alternatively.

Those skilled in the art will appreciate that yet other embodiments and modifications to the described example embodiments may be made, within the scope of the claimed invention.

What is claimed is:

1. A received signal strength indicator, comprising:
   a pair of input transistors with coupled emitters and with base electrodes to which an input signal is differentially applied;
   a collector load circuit associated with each input transistor, each collector load circuit including a first active device configured as a current source, connected between a first supply terminal and a collector of the respective input transistor, and including an output node; and
   a tail current sink including a second active device connected between a second supply terminal and the coupled emitters;
   wherein the first active device in each collector load circuit associated with each input transistor is adapted and configured to supply a current copied from the tail current; and
   wherein a signal strength indicator signal is obtained from a differential signal between the corresponding output nodes of the collector load circuits by taking the mean value of the differential signal referenced to the first supply terminal.

2. The received signal strength indicator according to claim 1, wherein the collector load circuit of each input transistor includes a resistor connected in parallel with the current source, and wherein the output node is the collector node.

3. The received signal strength indicator according to claim 1, wherein the collector load circuit of each input transistor includes a common base connected transistor and a resistor connected in the collector path of the common base connected transistor, the common base connected transistor and resistor being connected in parallel with the current source; and the output node is the connection node between the resistor and the collector of the common mode connected transistor.

4. The received signal strength indicator according to claim 1, wherein the collector load circuit of each input transistor includes a diode connected in series with a resistor, the diode and resistor being connected in parallel with the current source; and the output node is the connection node between the resistor and the diode.

5. The received signal strength indicator according to claim 1, wherein the first active device configured as the current source in each collector load circuit is a MOS transistor connected as a current mirror.

6. A received signal strength indicator comprising:
- a pair of input transistors with coupled emitters and with base electrodes to which an input signal is differentially applied;
- a collector load circuit associated with each input transistor, each collector load circuit including a first active device configured as a current source, connected between a first supply terminal and a collector of the respective input transistor; and
- a tail current sink including a second active device connected between a second supply terminal and the coupled emitters;
- wherein the first active device in each collector load circuit associated with each input transistor is adapted and configured to supply a current copied from the tail current; each collector load circuit includes a common base connected transistor having an emitter connected to the collector of the respective input transistor, the common base connected transistors having a common collector node which is connected to the first supply terminal through a load resistor, and a signal strength indicator signal is obtained from the common collector node as referenced to the first supply terminal.

7. The received signal strength indicator according to claim 6, wherein the active device configured as the current source in each collector load circuit is a MOS transistor connected as a current mirror.

8. The received signal strength indicator according to claim 7, comprising a circuit branch connected between the first and second supply terminals, the circuit branch including a MOS transistor connected to copy the tail current; and the MOS transistor in each collector load circuit being adapted and configured for mirroring the current in the circuit branch.

9. The received signal strength indicator according to claim 8, wherein the tail current sink includes a MOS transistor, adapted and configured to be controlled by a same bias control voltage as the MOS transistor in the circuit branch.

10. The received signal strength indicator according to claim 1, wherein the emitter circuits of the input transistors include a degeneration resistor.

* * * * *